US011500685B2

(12) United States Patent
Singleton, IV

(10) Patent No.: US 11,500,685 B2
(45) Date of Patent: Nov. 15, 2022

(54) MIXED INSTANCE CATALOGS

(71) Applicant: Citrix Systems, Inc., Fort Lauderdale, FL (US)

(72) Inventor: Leo C. Singleton, IV, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 59 days.

(21) Appl. No.: 16/043,747

(22) Filed: Jul. 24, 2018

(65) Prior Publication Data

US 2020/0034168 A1 Jan. 30, 2020

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 9/5044* (2013.01); *G06F 9/5077* (2013.01); *G06F 2009/4557* (2013.01); *G06F 2009/45591* (2013.01); *G06F 2009/45595* (2013.01)

(58) Field of Classification Search
CPC ..... G06F 2009/4557; G06F 2209/5019; G06F 9/505; H04L 43/08; H04L 67/22
See application file for complete search history.

(56) References Cited

U.S. PATENT DOCUMENTS

| | | | | |
|---|---|---|---|---|
| 8,392,928 B1* | 3/2013 | Forys | ................... | G06F 9/5061 718/104 |
| 8,738,333 B1* | 5/2014 | Behera | ................... | G06F 9/5061 703/2 |
| 10,207,184 B1* | 2/2019 | Leung | ................... | H04L 65/1069 |
| 2009/0106571 A1* | 4/2009 | Low | ...................... | G06F 9/4856 713/310 |
| 2011/0161957 A1* | 6/2011 | Bernardi | ................. | G06F 9/505 718/1 |
| 2011/0196908 A1* | 8/2011 | Sukthankar | ............ | G06N 3/126 709/201 |
| 2011/0239215 A1* | 9/2011 | Sugai | .................... | G06F 9/5088 718/1 |
| 2013/0179574 A1* | 7/2013 | Calder | ................. | G06F 9/45558 709/226 |
| 2014/0344457 A1* | 11/2014 | Bruno, Jr. | ............... | A63F 13/12 709/226 |
| 2016/0139948 A1* | 5/2016 | Beveridge | ............. | G06F 9/5005 718/1 |

(Continued)

OTHER PUBLICATIONS

J. Wang, P. Varman, C. Xie, Avoiding performance fluctuation in cloud storage, in: International Conference on High Performance Computing (HiPC), Goa, India, 2010, pp. 1-9 (Year: 2010).*

(Continued)

*Primary Examiner* — Jacob D Dascomb
(74) *Attorney, Agent, or Firm* — Banner & Witcoff, Ltd.

(57) ABSTRACT

Methods and systems for providing services using mixed instance catalogs are described herein. A catalog may comprise a plurality of first virtual machines and a plurality of second virtual machines. The capacity of a first virtual machine may be larger than the capacity of a second virtual machine. Connection requests to access a service associated with the catalog may be distributed among the plurality of first virtual machines and the plurality of second virtual machines.

19 Claims, 8 Drawing Sheets

(56) References Cited

U.S. PATENT DOCUMENTS

| | | |
|---|---|---|
| 2016/0210175 A1* | 7/2016 | Morimura ............ G06F 9/45533 |
| 2016/0246625 A1* | 8/2016 | Katsura ..................... G06F 9/46 |
| 2017/0111446 A1 | 4/2017 | Rivera et al. |
| 2017/0228676 A1* | 8/2017 | Cherkasova ........ G06F 9/44505 |
| 2018/0143866 A1* | 5/2018 | Das ....................... G06F 9/5077 |
| 2018/0278675 A1* | 9/2018 | Thayer ................ G06F 9/45558 |
| 2019/0213027 A1* | 7/2019 | Bhandari .............. G06F 9/5077 |

OTHER PUBLICATIONS

J. Cervino, E. Kalyvianaki, J. Salvachua, and P. Pietzuch, "Adaptive provisioning of stream processing systems in the cloud," in Data Engineering Workshops (ICDEW), 2012 IEEE 28th International Conference on. IEEE, 2012, pp. 295-301 (Year: 2012).*

* cited by examiner

MIXED INSTANCE CATALOGS

FIELD

Aspects described herein generally relate to computer and network hardware and software. In particular, the present disclosure relates to methods and systems for providing services using mixed instance catalogs in a cloud system.

BACKGROUND

Enterprises are increasingly adopting cloud computing services, which may provide various resources (e.g., applications or desktops) as a service to users. Users may access service sessions hosted by virtual machines in a catalog. The virtual machines in a catalog may consume energy and computational resources just as physical machines. Additionally, the virtual machines in a catalog may be priced or charged by cloud computing vendors based on hourly rates. Architecture for improving efficiency of a catalog in various situations may be developed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Examples described herein are directed towards a system, an apparatus, and/or computer readable media configured to perform a method for providing services using mixed instance catalogs. A computing device may receive, from a user device, a connection request to access a service session associated with a catalog. The computing device may determine, based on determining that the catalog comprises a plurality of first virtual machines and a plurality of second virtual machines, whether a quantity of a plurality of service sessions hosted by the plurality of first virtual machines satisfies a session count threshold associated with the plurality of first virtual machines. The computing device may determine, based on determining that the quantity of the plurality of service sessions hosted by the plurality of first virtual machines satisfies the session count threshold associated with the plurality of first virtual machines, a virtual machine, of the plurality of second virtual machines, to host the service session. The computing device may send, to the virtual machine, an instruction to host the service session.

In some examples, a session count threshold associated with a first virtual machine of the plurality of first virtual machines may be larger than a session count threshold associated with a second virtual machine of the plurality of second virtual machines. In some examples, a hardware capacity associated with a first virtual machine of the plurality of first virtual machines may be larger than a hardware capacity associated with a second virtual machine of the plurality of second virtual machines.

In some examples, the computing device may receive, from a second user device, a second connection request to access a second service session associated with the catalog. The computing device may determine, based on determining that the quantity of the plurality of service sessions hosted by the plurality of first virtual machines does not satisfy the session count threshold associated with the plurality of first virtual machines, a first virtual machine, of the plurality of first virtual machines, to host the second service session. The computing device may send, to the first virtual machine, an instruction to host the second service session.

In some examples, the determining the first virtual machine to host the second service session may be further based on determining that a quantity of concurrent logon service sessions associated with the plurality of first virtual machines does not satisfy a concurrent logon threshold. In some examples, the determining the first virtual machine to host the second service session may comprise selecting, based on balancing loads of the plurality of first virtual machines, the first virtual machine to host the second service session.

In some examples, the computing device may determine, based on the quantity of the plurality of service sessions hosted by the plurality of first virtual machines, the session count threshold associated with the plurality of first virtual machines, a quantity of a second plurality of service sessions hosted by the plurality of second virtual machines, and a second session count threshold associated with the plurality of second virtual machines, a remaining capacity of the catalog. The computing device may power on, based on determining that the remaining capacity of the catalog does not satisfy a remaining capacity threshold, an additional second virtual machine.

In some examples, the computing device may receive, from the user device, a connection termination request to terminate the service session associated with the catalog. The computing device may terminate the service session associated with the catalog. The computing device may determine, based on terminating the service session associated with the catalog, whether a second virtual machine of the plurality of second virtual machines hosts no service sessions. The computing device may power off, based on determining that the second virtual machine of the plurality of second virtual machines hosts no service sessions, the second virtual machine.

In some examples, the computing device may monitor usage of the catalog. The computing device may generate, based on the usage of the catalog, a recommendation indicating a second plurality of the first virtual machines to be provisioned and a second plurality of the second virtual machines to be provisioned.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing services using mixed instance catalogs. A catalog may comprise a plurality of first virtual machines and a plurality of second virtual machines. The capacity of a first virtual machine may be larger than the capacity of a second virtual machine. Connection requests to access a service associated with the catalog may be distributed among the plurality of first virtual machines and the plurality of second virtual machines.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
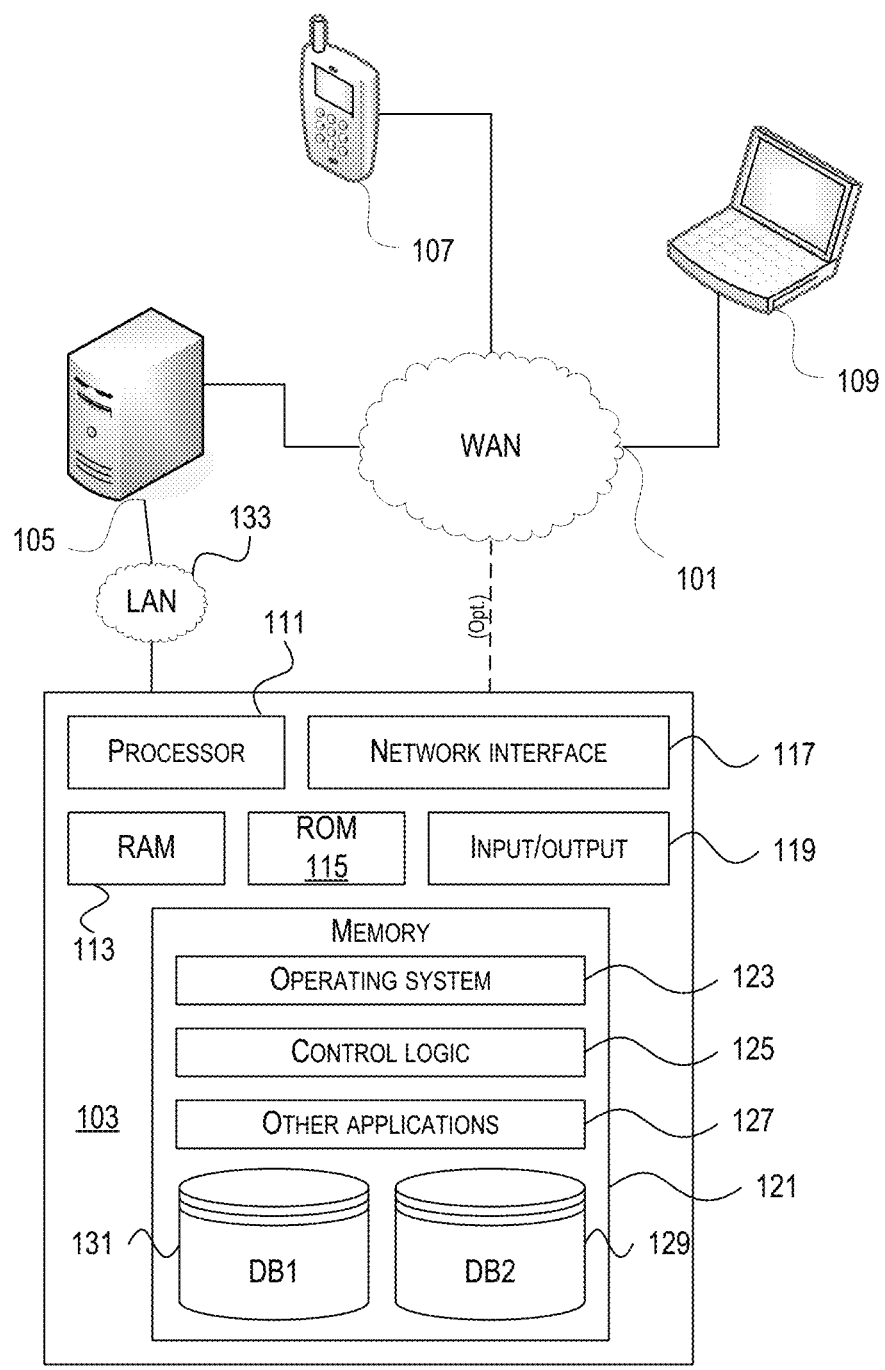
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
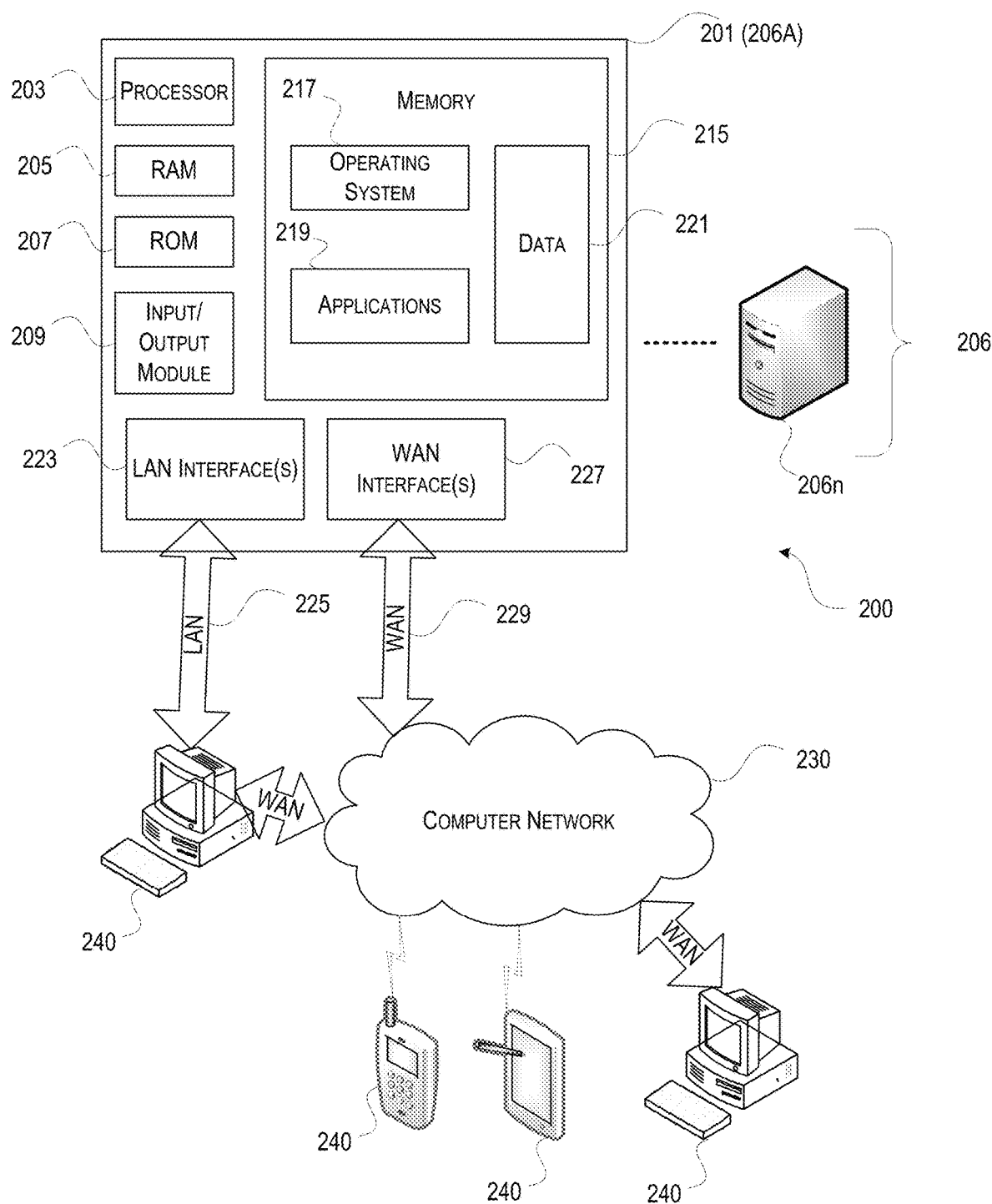
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
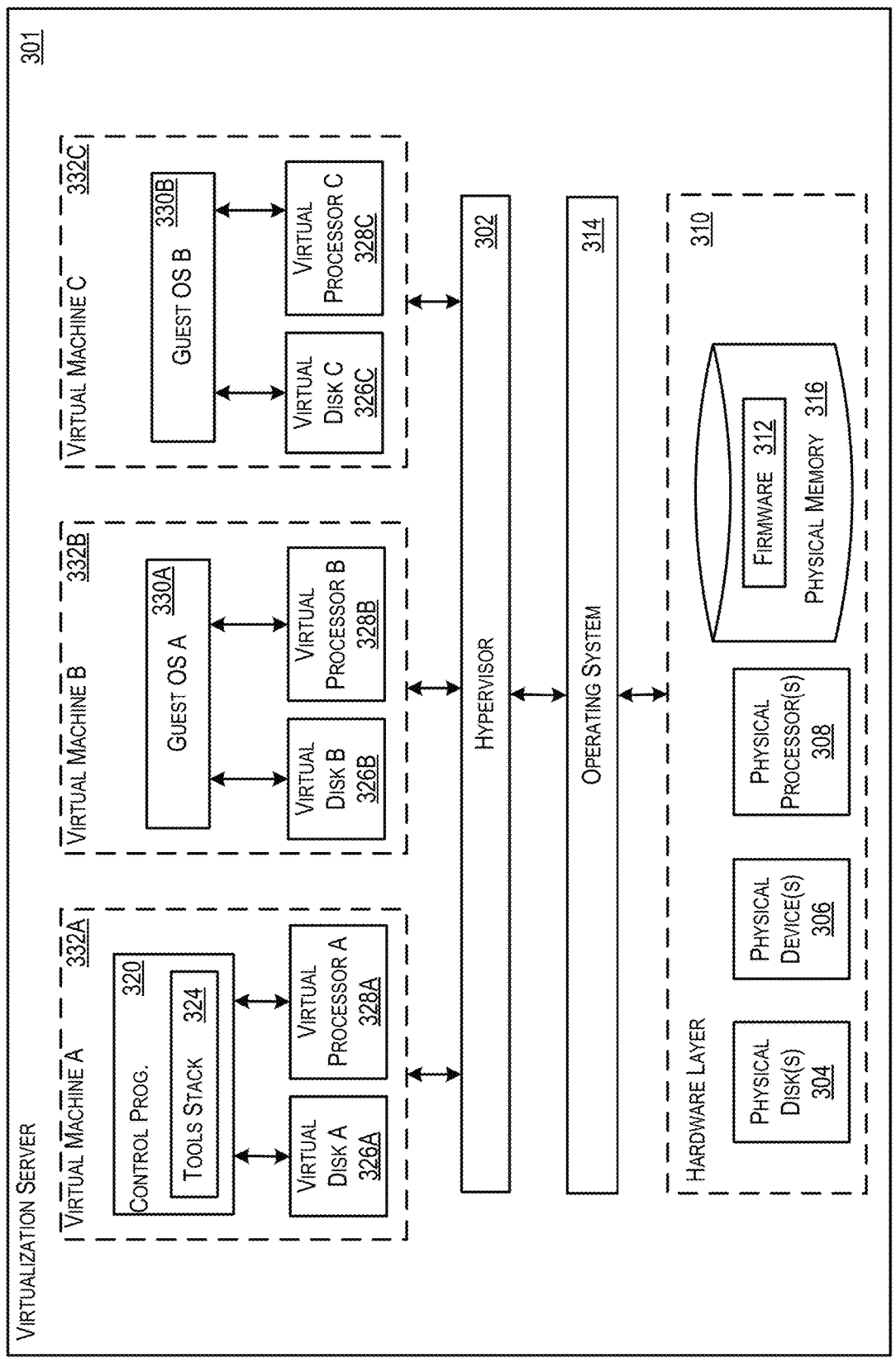
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
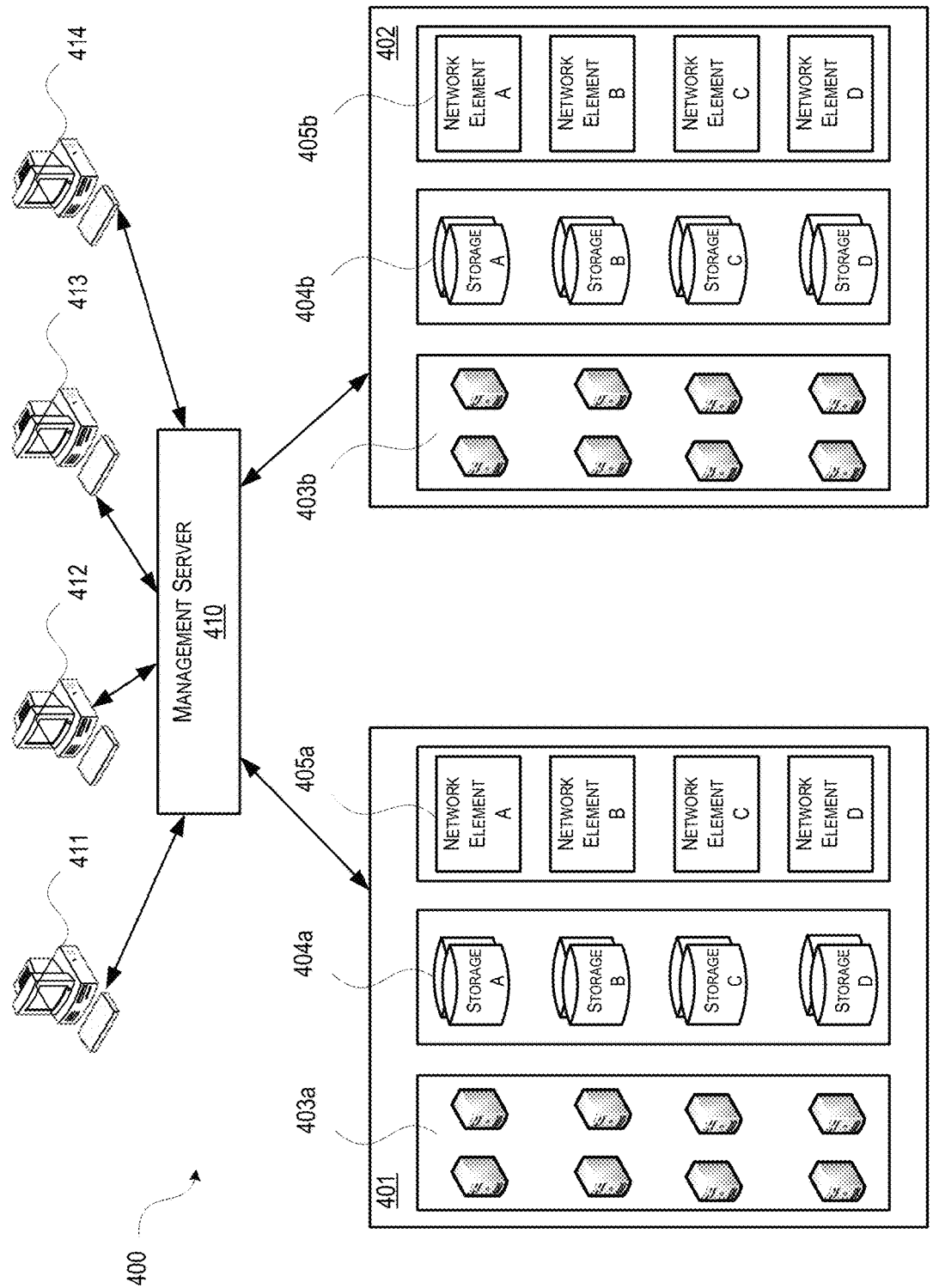
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Mixed Instance Catalogs

Figure 5:
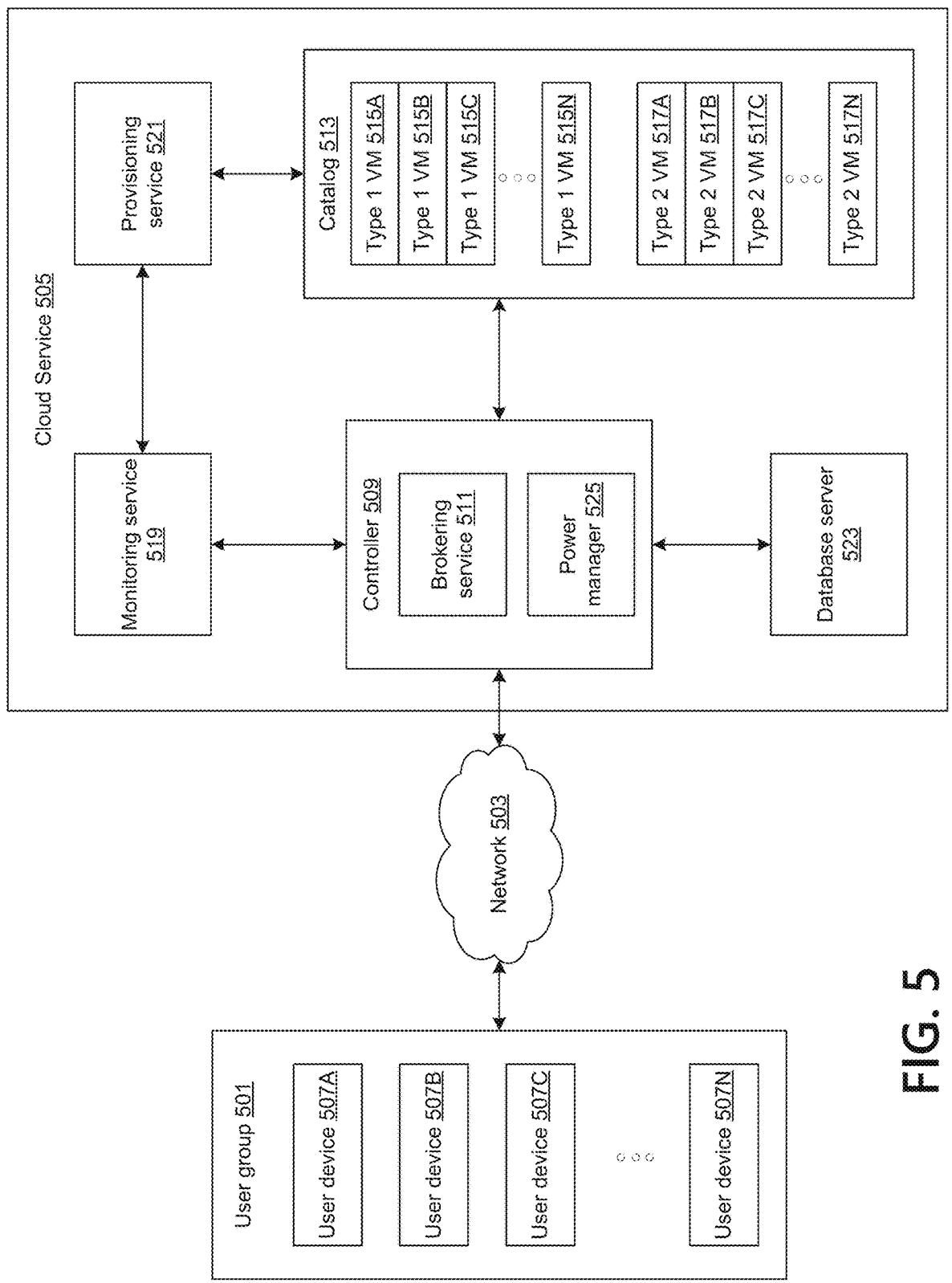
FIG. 5 is a schematic diagram showing an example system for providing services using mixed instance catalogs in accordance with one or more illustrative aspects described herein.

FIG. 5 is a schematic diagram showing an example system for providing services using mixed instance catalogs. The system may comprise one or more user groups (e.g., user group 501), one or more networks (e.g., network 503), and one or more cloud services (e.g., cloud service 505). The user group 501 may comprise one or more user devices (e.g., user devices 507A-507N). A user device of the user devices 507A-507N may comprise, for example, the client computers 107, 109, the client devices 240, the client computers 411-414, or other computing devices.

The user devices 507A-507N may communicate with the cloud service 505 via the network 503. The network 503 may be, for example, the wide area network 101, the computer network 230, the Internet, or other types of networks. The network 503 may use a plurality of interconnected communication links to connect the user devices 507A-507N and the cloud service 505. A user device of the user devices 507A-507N may access services (e.g., applications, desktops, etc.) hosted by the cloud service 505.

The cloud service 505 may comprise processes implemented on, for example, the data server 103, the web server 105, the servers 206, the virtualization server 301, the zones 401-402, or other types of computing devices. The cloud service 505 may be, for example, a public cloud that is open for public use, and may be implemented based on application virtualization software and/or desktop virtualization software. The cloud service 505 may comprise one or more controllers (e.g., controller 509), one or more catalogs (e.g., catalog 513), one or more monitoring services (e.g., monitoring service 519), one or more provisioning services (e.g., provisioning service 521), and one or more database servers (e.g., database server 523). The controller 509 may comprise one or more brokering services (e.g., brokering service 511) and one or more power managers (e.g., power manager 525).

The cloud service 505 may be configured to provide one or more services (e.g., applications, desktops, or other types of services) to users of the cloud service 505. The services may be provided to the users via the network 503 and/or the user devices 507A-507N. For example, a user device of the user devices 507A-507N may access a service session hosted by a virtual machine in the catalog 513.

The applications and/or desktops may be virtualized using application virtualization software and/or desktop virtualization software. With application virtualization and/or desktop virtualization, one or more sessions of an application or desktop may be hosted in a physical machine or virtual machine in the cloud service 505. For example, the virtual machines in the catalog 513 may be used to host virtualized application sessions, virtualized desktop sessions, and/or other service sessions that may be delivered to users.

A catalog (e.g., the catalog 513) may comprise collections of physical machines (e.g., physical computing devices) or virtual machines managed as a single entity. A catalog may also be referred to as a machine catalog, a session machine catalog, a machine collection, a machine group, or other names known to a person of ordinary skill in the art. The virtual machines in a catalog may have the same hardware specifications (e.g., virtual Central Processing Unit (vCPU) capacity, Random Access Memory (RAM) size, storage size, or other settings). For example, each of the virtual machines in a catalog may have a 4 core vCPU and 16 GB RAM. Additionally or alternatively, the virtual machines in a catalog may have different hardware specifications.

The virtual machines in a catalog may have the same type of operating system installed. For example, each of the virtual machines in a catalog may implement a WINDOWS operating system. Additionally, the virtual machines in a catalog may have the same one or more services installed. The virtual machines in a catalog (e.g., the catalog 513) may be created by the provisioning service 521. The provisioning service 521 may comprise, for example, CITRIX provisioning tools such as Machine Creation Services (MCS) or Provisioning Services (PVS). Other tools may be used to provision the virtual machines in a catalog.

The virtual machines in a catalog (e.g., the catalog 513) may be, for example, created based on a master image. The master image may be created using a hypervisor and/or other tools. The hardware specification (e.g., vCPU capacity, the RAM size, storage size, etc.) of the master image may be specified using the hypervisor. An operating system (e.g., WINDOWS, LINUX, etc.) and one or more services (e.g., applications or desktops) may be installed on the master image. The provisioning service 521 may create (e.g., clone), based on the master image, virtual machines to form the catalog. The virtual machines in the catalog may have the same hardware specification, the same operating system, and the same services, as the master image. The provisioning service 521 may create different types of virtual machines based on different master images.

Additionally or alternatively, the provisioning service 521 may create one or more virtual machines in a catalog according to hardware specifications provided by, for example, an administrator. The provisioning service 521 may then initiate the one or more created virtual machines by installing operating systems and services on the created virtual machines. For example, the administrator may install the operating system and one or more services on one of the virtual machines, and the provisioning service 521 may use that one virtual machine as a template to initiate the remaining virtual machines. The virtual machines in the catalog 513 may be registered to the controller 509, the brokering service 511, and/or the power manager 525, after the provisioning service 521 completes provisioning the virtual machines.

The controller 509 may be a central management component of the cloud service 505. The controller 509 may communicate with virtual machines in the catalog 513, authenticate and manage user requests to access services, facilitate brokering (e.g., distributing) user requests to the virtual machines, etc. For example, after a user device sends a request to access a service provided by the cloud service 505, the controller 509 may receive the request, and the brokering service 511 in the controller 509 may select a virtual machine in the catalog 513 to host a session of the requested service. The brokering service 511 may perform the selection of the virtual machine in such a manner that service requests received by the cloud service 505 may be evenly distributed among the virtual machines in the catalog 513. After the selection of the virtual machine, the brokering service 511 may send, to the selected virtual machine, the request to access the service (and/or a message instructing the selected virtual machine to host the service session). The selected virtual machine may initiate the service session, and may initiate processes to establish a connection with the user device, so that the user device may access the service session.

The power manager 525 may be configured to control (e.g., power on or power off) the virtual machines in the catalog 513. For example, after the provisioning service 521 completes provisioning of the virtual machines in the catalog 513, the power manager 525 may power on one or more of the provisioned virtual machines, so that the powered on virtual machines may host service sessions subsequently requested by user devices 507A-507N. Additionally or alternatively, the power manager 525 may power off a running (e.g., powered on) virtual machine, if user devices 507A-507N log off or terminate service sessions hosted by the running virtual machine and/or the running virtual machine becomes idle (e.g., the running virtual machine does not host any service sessions).

The power manager 525 may keep an idle virtual machine running and might not power off such an idle virtual machine, so that the running virtual machines have enough remaining capacity to host a subsequent service session. In this manner, when a user device requests to access a service, the user device might not have to wait for a virtual machine to be powered on to host a session of the service, because the running virtual machines may have enough capacity to host the service session.

The monitoring service 519 may monitor the functioning of the cloud service 505. The monitoring service 519 may monitor the usage of the catalog 513. For example, the monitoring service 519 may monitor the quantity of service sessions hosted by the virtual machines in the catalog 513. An agent may be implemented on each virtual machine in the catalog 513 for reporting (e.g., in real time) the running status of the virtual machine to the controller 509. The running status information may then be sent to the monitoring service 519. The monitoring service 519 may use other methods to gather information related to the virtual machines in the catalog 513. The database server 523 may be used to store any type of information (e.g., data used by the cloud service 505). For example, the database server 523 may be used to store information gathered by the monitoring service 519 (e.g., historical data indicating usage of the catalog 513).

Some service sessions (e.g., virtualized WINDOWS applications and/or desktops) may be adhesive to the virtual machines in the catalog 513. For example, after a WINDOWS based service session starts running on a virtual machine, migrating the service session to another virtual machine may be difficult and/or impossible. The adhesive service sessions may cause wasted energy or resources. For example, a virtual machine may have enough capacity to host 40 service sessions, but the virtual machine might not be powered off even if only one adhesive service session is running on the virtual machine. Substantial computational resources of the virtual machine (e.g., the computational resources to host the remaining 39 service sessions) may remain unused and wasted. If the virtual machine is priced or charged by cloud computing vendors based on an hourly rate and the amount of time that the virtual machine is running, not powering off the virtual machine may contribute to causing the virtual machine to cost more money to users of the virtual machine.

Using virtual machines with smaller capacities may help improve efficiency and reduce wasted energy in one or more of the situations discussed above. For example, if each of 10 virtual machines has the capacity to host four service sessions, and if there is one adhesive service session running on one of the 10 virtual machines, the system may be able to power off the other nine of the 10 virtual machines. In this manner, the amount of computational resources wasted may be reduced.

In some situations, virtual machines with smaller capacities might not be as efficient as virtual machines with larger capacities. Some overhead computational cost (e.g., computational resources consumed by the operating system running on the virtual machine and/or by the virtualization software running on the virtual machine) may be the same for both a large capacity virtual machine and a small capacity virtual machine. If virtual machines are running near full capacity, the overhead computational cost per service session may be smaller if service sessions are running on a large capacity virtual machine than if service sessions are running on a small capacity virtual machine. For example, if a large capacity virtual machine has capacity to host 40 service sessions and if it is hosting 40 service sessions, the overhead computational cost for each service session may be the overhead computational cost associated with the large capacity virtual machine divided by 40. If a small capacity virtual machine has the capacity to host four service sessions and if it is hosting four service sessions, the overhead computational cost for each service session may be the overhead computational cost associated with the small capacity virtual machine divided by four. The overhead computational cost associated with a large capacity virtual machine may be equal or similar to the overhead computational cost associated with a small capacity virtual machine. Therefore, if a virtual machine frequently functions near full capacity, it may be more energy efficient if it has a larger capacity. Additionally or alternatively, if a virtual machine frequently functions near full capacity, the cost (e.g., energy, computing resources, and/or money charged by cloud computing vendors) per service session for the service sessions running on the virtual machine may be reduced if the virtual machine has a larger capacity.

Using mixed instance catalogs may alleviate the challenge discussed above. For example, a mixed instance catalog may comprise different types of virtual machines with different capacities. Large capacity virtual machines may be used to handle base load of the catalog, and small capacity virtual machines may be used to handle peak load of the catalog. For example, the catalog 513 may comprise type 1 virtual machines 515A-515N and type 2 virtual machines 517A-517N. The type 1 virtual machines 515A-515N may have larger capacities, and the type 2 virtual machines 517A-517N may have smaller capacities. The type 1 virtual machines 515A-515N may be configured to host the base load, and the type 2 virtual machines 517A-517N may be configured to host the peak load. In this manner, computational resources may be saved, and efficiency may be improved. Additionally or alternatively, there may be more than two types of virtual machines. More details regarding using mixed instance catalogs are discussed further in connection with FIGS. 6-8.

Figure 6:
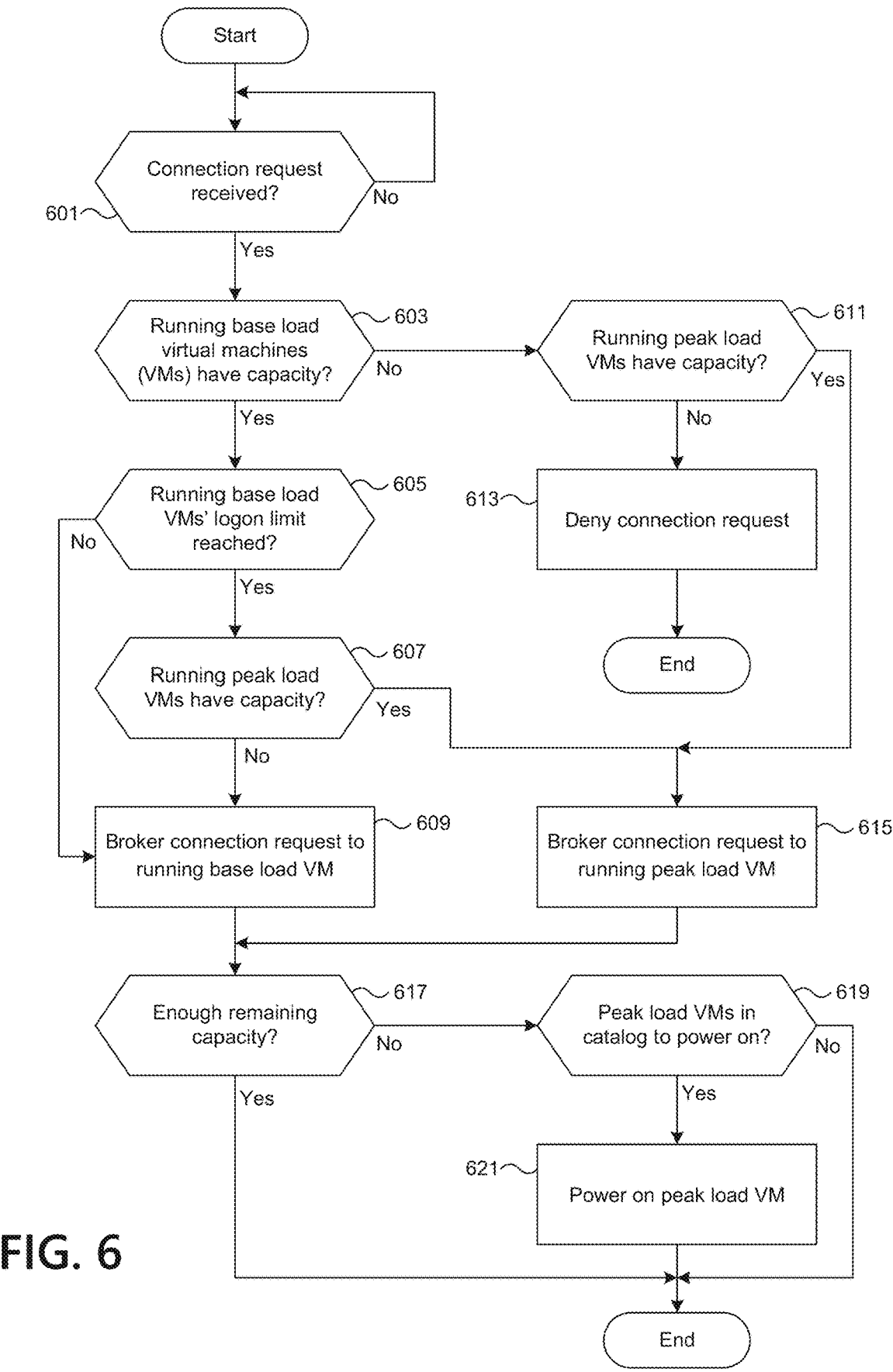
FIG. 6 is a flowchart showing an example method for providing services using mixed instance catalogs in accordance with one or more illustrative aspects described herein.

FIG. 6 is a flowchart showing an example method for providing services using mixed instance catalogs. The example method may be performed, for example, by the system as discussed in connection with FIG. 5 (e.g., the cloud service 505, the brokering service 511, and/or the power manager 525). The steps of the example method are described as being performed by particular computing devices for the sake of simplicity, but the steps may be performed by any other computing devices.

In step 601, the system (e.g., the controller 509) may determine whether the system receives a connection request (e.g., from a user device of the user devices 507A-507N). The connection request may indicate a service (e.g., a virtualized application, a virtualized desktop, or other types of services) that a user associated with the user device may intend to access.

For example, a user associated with a user device of the user devices 507A-507N may connect to the cloud service 505 via a client agent implemented on the user device. The client agent may be a software application executing on a client device that facilitates communications with remote resources and/or virtualized resources. Via the client agent, the user may indicate, to the controller 509 and in a connection request, a service (e.g., an application or desktop) that the user may intend to access. The controller 509 (and/or the brokering service 511) may receive the connection request indicating the service that the user may intend to access.

If the system receives a connection request, the method may proceed to step 603. Otherwise, the method may go back to step 601, where the system (e.g., the controller 509) may continue listening to incoming traffic to determine if a connection request is indicated in the incoming traffic.

After receiving a connection request, the brokering service 511 may select a virtual machine (e.g., a running or powered on virtual machine), from the virtual machines 515A-515N or 517A-517N in the catalog 513, to host a session of the service indicated in the connection request. Additionally or alternatively, the brokering service 511 may be configured to determine whether the catalog 513 comprises two or more types of virtual machines. If the catalog 513 comprises two or more types of virtual machines, the brokering service 511 may proceed to step 603. If the catalog 513 comprises one type of virtual machine, the brokering service 511 may use a load balancing algorithm to select a virtual machine to host the service session. For example, connection requests received by the system may be evenly distributed among the virtual machines in the catalog 513.

In step 603, the brokering service 511 may determine whether running base load virtual machines in the catalog 513 have capacity to host the service session. As discussed above, in order to save energy, reduce computational cost, and/or improve efficiency, the catalog 513 may comprise one or more base load virtual machines and one or more peak load virtual machines. The base load virtual machines may have larger capacities than the peak load virtual machines. For example, each of the base load virtual machines may have a 16 GB RAM and an 8 core vCPU, and each of the peak load virtual machines may have a 4 GB RAM and a 2 core vCPU. Additionally or alternatively, the catalog 513 may comprise more than two types of virtual machines. For example, the catalog 513 may comprise three, four, five, or more types of virtual machines.

The determination of whether the running base load virtual machines in the catalog 513 have capacity to host the service session may be made in various manners. For example, the brokering service 511 may monitor the usage rate of the RAM, vCPU, and/or other components of the running base load virtual machines. If the usage rate of the RAM, vCPU, and/or other components of the running base load virtual machines satisfies (e.g., meets, exceeds, etc.) a usage rate threshold, the brokering service 511 may determine that the running base load virtual machines do not have capacity to host the service session. Otherwise, the brokering service 511 may determine that the running base load virtual machines have capacity to host the service session.

Additionally or alternatively, the capacity of the running base load virtual machines to host service sessions may be represented in the form of a session count threshold, and the brokering service 511 may determine whether the running base load virtual machines have capacity to host the service session based on the session count threshold. For example, the brokering service 511 may determine a quantity of service sessions that are currently hosted by the running base load virtual machines. If the quantity of service sessions that are currently hosted by the running base load virtual machines satisfies a session count threshold, the brokering service 511 may determine that the running base load virtual machines do not have capacity to host the service session. The session count threshold may be determined based on the total available capacity of the running base load virtual machines and the amount of computational resources that a service session may require.

If the brokering service 511 determines that the running base load virtual machines have capacity to host the service session, the method may proceed to step 605. Otherwise, the method may proceed to step 611. In step 605, the brokering service 511 may determine whether the logon limit of the running base load virtual machines in the catalog 513 has been reached. When a service session (e.g., a virtualized application session or a virtualized desktop session) is first launched on a virtual machine, the service session's initialization processes may take a substantial amount of computational resources from the virtual machine (e.g., more than after the service session has completed its initialization processes). In order to avoid too many concurrent launches of service sessions consuming too much computational resource of the virtual machine, a concurrent logon limit may be used to limit the number of concurrent launches of service sessions. The concurrent logon limit associated with a virtual machine may be lower than the session count threshold associated with the virtual machine. For example, a virtual machine configured to handle 40 service sessions (e.g., with a session count threshold of 40) may be configured to handle two concurrent launches (e.g., with a concurrent logon limit of two).

The concurrent logon limit associated with the running base load virtual machines may be determined based on the capacity of the running base load virtual machines and the amount of computational resources for the initialization of a service session. If the brokering service 511 determines that the concurrent logon limit of the running base load virtual machines has been reached, the method may proceed to step 607. Otherwise, the method may proceed to step 609.

In step 607, the brokering service 511 may determine whether running peak load virtual machines have capacity to host the service session. The brokering service 511 may make this determination in various manners. For example, the brokering service 511 may make this determination in a similar manner as in step 603 with respect to the running base load virtual machines. The brokering service 511 may, for example, monitor the current usage rates of the vCPU, RAM, or other components of the running peak load virtual machines, and may determine whether the current usage rates satisfy one or more usage rate thresholds. Additionally or alternatively, the brokering service 511 may determine a quantity of service sessions that are hosted by the running peak load virtual machines, and may determine whether the quantity satisfies a session count threshold associated with the running peak load virtual machines. If the brokering service 511 determines that the running peak load virtual machines have capacity to host the service session, the method may proceed to step 615. Otherwise, the method may proceed to step 609.

In step 609, the brokering service 511 may broker the connection request to a running base load virtual machine. For example, the brokering service 511 may send the connection request to the running base load virtual machine, or otherwise indicate, to the running base load virtual machine, that the running base load virtual machine is to host the service session. The running base load virtual machine may receive the brokered connection request, may initiate the service session requested, and may establish a connection with the user device that sent the connection request so that the user of the user device may access the service session.

If there is more than one running base load virtual machine, the brokering service 511 may perform a load balancing algorithm. For example, the brokering service 511 may select, based on the load balancing algorithm, one of the running base load virtual machines, and may distribute the connection request to the selected running base load virtual machine. The brokering service 511 may perform the load balancing algorithm in such a manner that connection requests received by the cloud service 505 may be distributed among the running base load virtual machines evenly or substantially evenly. For example, the brokering service 511 may first distribute one connection request to each of the running base load virtual machines. After each of the running base load virtual machines receives one connection request and starts to host one service session, the brokering service 511 may start to distribute another connection request to each of the running base load virtual machines, and so on and so forth. After step 609, the method may proceed to step 617, which will be described below.

Returning to step 603, if the brokering service 511 determines that the running base load virtual machines do not have capacity to host the service session, the brokering service 511 may, in step 611, determine whether running peak load virtual machines have capacity to host the service session. This determination may be made in a similar manner as in step 607 described above.

If the brokering service 511 determines that the running peak load virtual machines do not have capacity to host the service session, the method may proceed to step 613. In step 613, the brokering service 511 may deny the connection request (e.g., because of insufficient capacity to host the service session), and may send a message of access denial to the user device that sent the connection request. Otherwise, the method may proceed to step 615.

In step 615, the brokering service 511 may broker the connection request to a running peak load virtual machine. For example, the brokering service 511 may send the connection request to the running peak load virtual machine, or otherwise indicate, to the running peak load virtual machine, that the running peak load virtual machine is to host the service session. The running peak load virtual machine may receive the brokered connection request, may initiate the service session requested, and may establish a connection with the user device that sent the connection request so that the user of the user device may access the service session.

If there is more than one running peak load virtual machine, the brokering service 511 may perform a load balancing algorithm. For example, the brokering service 511 may select, based on the load balancing algorithm, one of the running peak load virtual machines, and may distribute the connection request to the selected running peak load virtual machine. The brokering service 511 may perform the load balancing algorithm in such a manner that connection requests received by the cloud service 505 may be distributed among the running peak load virtual machines evenly or substantially evenly. For example, the brokering service 511 may first distribute one connection request to each of the running peak load virtual machines. After each of the running peak load virtual machines receives one connection request and starts to host one service session, the brokering service 511 may start to distribute another connection request to each of the running peak load virtual machines, and so on and so forth. After step 615, the method may proceed to step 617, which will be described below.

Additionally or alternatively, the brokering service 511 may predict or determine the length of a time period that the requested service session may be running on a virtual machine in the catalog 513. The time period may start from the point when the service session starts running on a virtual machine in the catalog 513, and may end at the point when the service session is terminated. The brokering service 511 may determine the length of the time period based on historical data. For example, a user may have previously used sessions of the requested service. The time periods during which the previous service sessions were running may be recorded. Based on the lengths of the previous time periods, the brokering service 511 may predict the length of the time period that the current service session may be running. For example, the brokering service 511 may use the average time period length (calculated based on the previous time periods) as an indicator of the length of the time period that the current service session may be running. The average time period length may be specific to the user.

If the predicted length of the time period is larger than a time length threshold (e.g., 24 hours, 48 hours, etc.), the brokering service 511 may broker the connection request to a base load virtual machine. If the predicted length of the time period is smaller than a second time length threshold (e.g., 6 hours, 4 hours, 2 hours, etc.), the brokering service 511 may broker the connection request to a peak load virtual machine, even if the base load virtual machines have capacity to host the service session and/or even if the concurrent logon limit of the base load virtual machines has not been reached. In this manner, a service session with a predicted short running time period may be hosted by a peak load virtual machine, and may leave room in the base load virtual machines for service sessions with predicted long running time periods. This may help save energy and computational cost because this may help avoid a situation where a substantial number of service sessions with long running time periods may be hosted by the peak load virtual machines, and a substantial number of service sessions with short running time periods may be hosted by the base load virtual machines.

In step 617, the power manager 525 may determine whether the running virtual machines (e.g., including the running base load virtual machines and the running peak load virtual machines) have enough remaining capacity to host additional service sessions. For example, the power manager 525 may determine the remaining capacity (e.g., available vCPU capacity, available RAM space, etc.) of the running virtual machines. If the remaining capacity satisfies (e.g., exceeds or meets) a remaining capacity threshold, the power manager 525 may determine that the running virtual machines have enough remaining capacity to host additional service sessions. Otherwise, the power manager 525 may determine that the running virtual machines do not have enough remaining capacity to host additional service sessions.

Additionally or alternatively, the power manager 525 may determine a remaining session count associated with the running virtual machines. If the remaining session count satisfies a remaining session count threshold, the power manager 525 may determine that the running virtual machines have enough remaining capacity to host additional service sessions. Otherwise, the power manager 525 may determine that the running virtual machines do not have enough remaining capacity to host additional service sessions. The remaining session count associated with the running virtual machines may be calculated based on the quantity of service sessions currently hosted by the running virtual machines and the session count threshold associated with the running virtual machines. For example, if the running virtual machines are currently hosting 100 service sessions, and the session count threshold associated the running virtual machines is 120, the remaining session count associated with the running virtual machines may be equal to 20 (e.g., 120 minus 100).

The session count threshold associated with the running virtual machines may be calculated based on the session count threshold associated with base load virtual machines and the session count threshold associated with peak load virtual machines. For example, if the session count threshold of a base load virtual machines is 40, the session count threshold of a peak load virtual machines is 4, and there are 2 running base load virtual machines and 10 running peak load virtual machines, the session count threshold associated with the running virtual machines may be equal to 120 (e.g., 40 times 2 plus 4 times 10).

The remaining session count threshold and/or the remaining capacity threshold may be calculated based on a percentage (e.g., 10%) of the session count threshold associated with the running virtual machines and/or a percentage of the total capacity of the running virtual machines. Additionally or alternatively, the remaining session count threshold and/or the remaining capacity threshold may be any predetermined amount.

If the power manager 525 determines that the running virtual machines do not have enough capacity to host additional service sessions, the method may proceed to step 619. In step 619, the power manager 525 may determine whether the catalog 513 includes a peak virtual machine that is currently inactive (e.g., not powered on yet) and that may be powered on. If the power manager 525 determines that there is such a peak load virtual machines in the catalog 513, the power manager 525 may, in step 621, power on the peak load virtual machine.

After the power manager 525 powers on the peak load virtual machine in step 621, the method may go back to step 617, where the power manager 525 may determine again whether the running virtual machines (including the one just powered on in step 621) have enough capacity to host additional service sessions.

The power manager 525 may additionally or alternatively determine whether the catalog 513 includes a base load virtual machine that is currently inactive (e.g., powered off previously, or not powered on yet) and that may be powered on. If the power manager 525 determines that there is such a base load virtual machine in the catalog 513, the power manager 525 may power on such base load virtual machine. The power manager 525 may make the determination of whether the catalog 513 includes a base load virtual machine that may be powered on prior to the determination of whether the catalog 513 includes a peak load virtual machine that may be powered on. And if the catalog 513 includes a base load virtual machine that may be powered on, the power manager 525 may power on the base load virtual machine, and may then go back to step 617. Otherwise, the power manager 525 may continue to determine whether the catalog 513 includes a peak load virtual machine that may be powered on, as discussed in connection with step 619. Additionally or alternatively, in some situations, the power manager 525 may keep the base load virtual machines running, and might not need to check whether a base load virtual machine is inactive. For example, if cloud computing vendors charge a base load virtual machine for a fixed price regardless of the amount of time that the base load virtual machine is running, the power manager 525 may keep the base load virtual machine always running (e.g., for the period that the cloud computing vendors allow the based load virtual machine to be used under the fixed price), even if the base load virtual machine becomes idle, and might not need to check whether the base load virtual machine is currently inactive.

Figure 7:
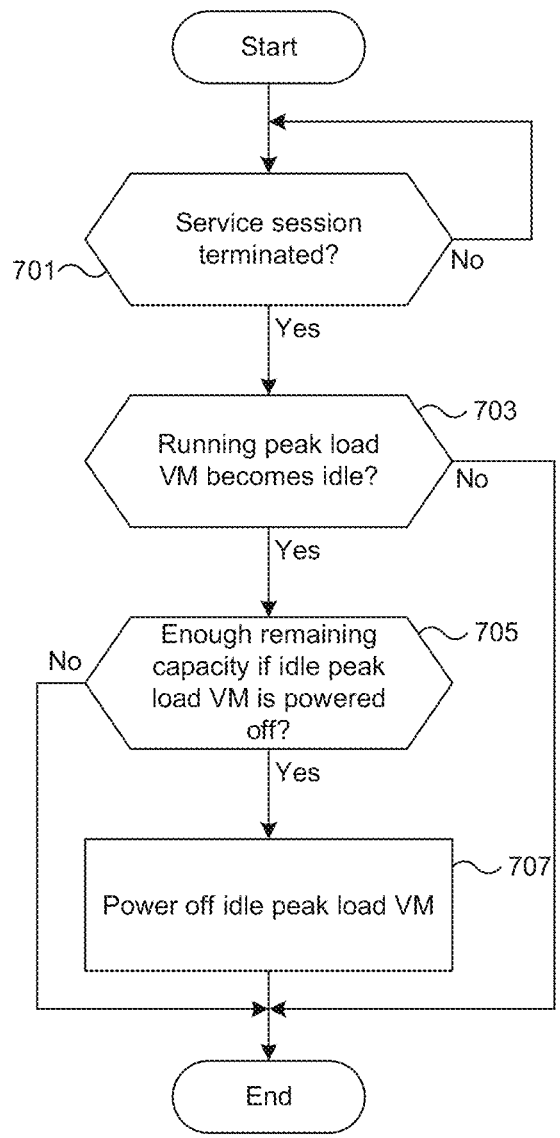
FIG. 7 is a flowchart showing an example method for power managing virtual machines in a mixed instance catalog in accordance with one or more illustrative aspects described herein.

FIG. 7 is a flowchart showing an example method for power managing virtual machines in a mixed instance catalog. The example method may be performed, for example, by the system (e.g., the cloud service 505 and/or the power manager 525) as discussed in connection with FIG. 5. The steps of the example method are described as being performed by particular computing devices for the sake of simplicity, but the steps may be performed by any other computing devices.

In step 701, the power manager 525 may determine whether a service session hosted by the cloud service 505 is terminated. The power manager 525 may determine, for example, whether the system receives, from a user device, a request to log off a service session. Additionally or alternatively, the power manager 525 may periodically or continuously check the running status of service sessions hosted by the virtual machines in the catalog 513. If the power manager 525 determines that a service session is terminated, the method may proceed to step 703. Otherwise, the power manager 525 may continue to determine whether a service session is terminated.

In step 703, the power manager 525 may determine whether a running peak load virtual machine becomes idle (e.g., hosting no service sessions). If the terminated service session was hosted by a running peak load virtual machine and if the terminated service session was the only service session that was hosted by the running peak load virtual machine, the termination of the service session may cause the running peak load virtual machine to become idle. If the power manager 525 determines that a running peak load virtual machine becomes idle, the method may proceed to step 705.

In step 705, the power manager 525 may determine whether the running virtual machines in the catalog 513 would have enough remaining capacity to host additional service sessions if the idle peak load virtual machine is powered off. The power manager 525 may make this determination in a similar manner as in step 617. If the power manager 525 determines that there would be enough remaining capacity, the power manager 525 may, in step 707, power off the idle peak load virtual machine.

Additionally or alternatively, the power manager 525 may determine whether a running base load virtual machine becomes idle because of the termination of a service session, and may power off an idle base load virtual machine in a similar manner as with respect to the idle peak load virtual machine discussed above. Additionally or alternatively, in some situations, the power manager 525 may determine not to power off a running base load virtual machine that has become idle. For example, if cloud computing vendors charge a base load virtual machine for a fixed price regardless of the amount of time that the base load virtual machine is running, the power manager 525 may determine not to power off the base load virtual machine and/or may keep the base load virtual machine always running (e.g., for the period that the cloud computing vendors allow the based load virtual machine to be used under the fixed price), even if the base load virtual machine becomes idle.

Figure 8:
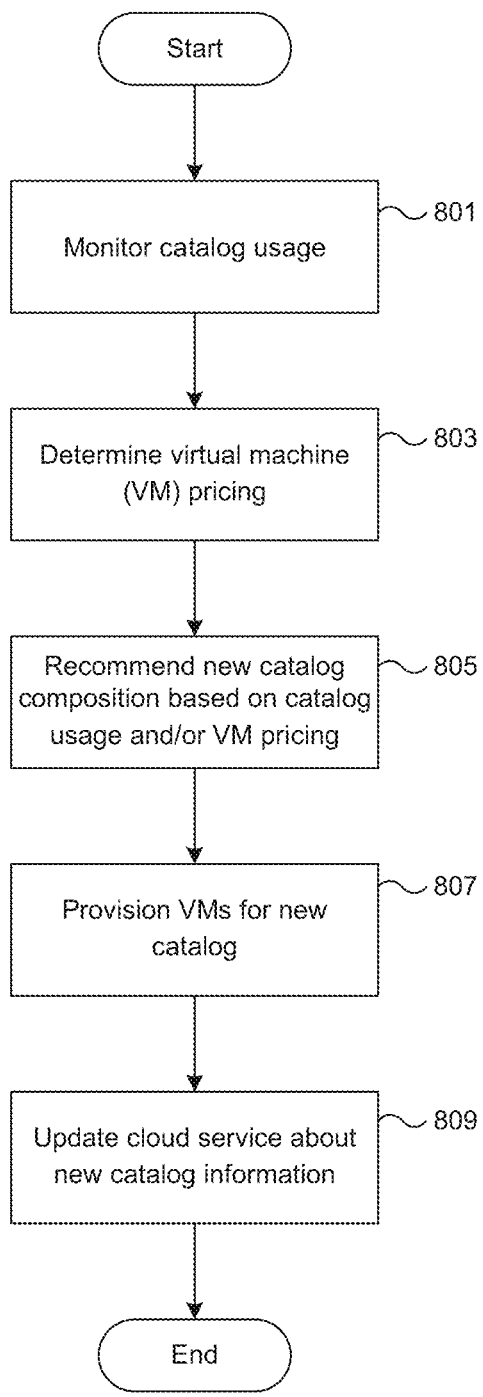
FIG. 8 is a flowchart showing an example method for using mixed instance catalogs in accordance with one or more illustrative aspects described herein.

FIG. 8 is a flowchart showing an example method for using mixed instance catalogs. The example method may be performed, for example, by the system (e.g., the cloud service 505, the monitoring service 519, and/or the provisioning service 521) as discussed in connection with FIG. 5. The steps of the example method are described as being performed by particular computing devices for the sake of simplicity, but the steps may be performed by any other computing devices.

In step 801, the monitoring service 519 may monitor usage of the catalog 513. For example, the monitoring service 519 may determine (e.g., periodically and over a period of time) the number of service sessions running on (and/or hosted by) the virtual machines in the catalog 513. Based on such data, the monitoring service 519 may generate a graph showing the trend of service session quantities over time (e.g., the x-axis of the graph may represent time, and the y-axis of the graph may represent the number of service sessions). Based on the data (and/or the graph), the monitoring service 519 may determine the minimum number of service sessions running on the virtual machines in the catalog 513 for any given time. Based on the data (and/or the graph), the monitoring service 519 may determine the average number of service sessions running on the virtual machines in the catalog 513 for a period of time. Based on the data (and/or the graph), the monitoring service 519 may determine the maximum number of service sessions running on the virtual machines in the catalog 513 for any given time, etc.

Additionally or alternatively, the monitoring service 519 may distinguish between the data for weekdays and the data for weekends (or holidays). For example, the monitoring service 519 may determine the minimum, average, and maximum numbers of service sessions running on the virtual machines in the catalog 513 for the weekdays. After step 801, the method may proceed to step 803.

In step 803, the system may determine the pricing of the different types of virtual machines. Some cloud vendors may offer large capacity virtual machines at a discount fixed price (regardless of how much time the virtual machines are actually powered on) if the buyer agrees to commit to the large capacity virtual machines for a period of time (e.g., 1 year, 2 years, etc.). After step 803, the method may proceed to step 805.

In step 805, the system may recommend a new catalog composition based on the usage of the catalog 513, and/or the pricing of virtual machines. The new catalog composition recommendation may be sent to a customer associated with (e.g., managing or administering) the catalog 513.

For example, the system may determine the base load of the catalog 513 and the peak load of the catalog 513. The base load of the catalog 513 may be, for example, equal to the minimum number of service sessions hosted by the catalog 513 (e.g., for the weekdays, or for the weekends and holidays). The base load of the catalog 513 may additionally or alternatively be a number between the minimum number of service sessions hosted by the catalog 513 and the maximum number of service sessions hosted by the catalog 513. The base load of the catalog 513 may additionally or alternatively be the average number of service sessions hosted by the catalog 513.

Additionally or alternatively, the trend of the number of service sessions running on the catalog 513 may resemble a sine wave. The system may apply a best fit curve (e.g., a sine function) to the catalog usage data (and/or a portion of the catalog usage data, e.g., catalog usage data for the weekends or catalog usage data for the weekdays). The system may use a sine function to model the trend of the number of service sessions running on the catalog 513. The system may determine the trough of the modeled sine function (or a number between the trough of the modeled sine function and the crest of the modeled sine function) to be the base load of the catalog 513.

The peak load of the catalog 513 may be, for example, equal to the maximum number of service sessions running on the catalog 513 (e.g., for the weekdays, or for the weekends and holidays) minus the base load of the catalog 513. The peak load may additionally or alternatively be determined using the modeled sine function. For example, the peak load of the catalog 513 may be set to be the crest of the modeled sine function minus the base load of the catalog 513.

The system may determine, based on the base load and the peak load, the number of base load virtual machines and the number of peak load virtual machines to be provisioned. The system may choose large capacity virtual machines to be the base load virtual machine, and then calculate the number of the base load virtual machines based on the base load and the capacity of the base load virtual machine. For example, if a base load virtual machine can handle 40 service sessions, and the base load is 70 service sessions, system may determine to provision two base load virtual machines so that the base load virtual machines may have some extra capacity to host service sessions. The system may choose small capacity virtual machines to be the peak load virtual machines, and then calculate the number of the peak load virtual machines based on the peak load and the capacity of the peak load virtual machine, in a similar manner as base load virtual machines.

Additionally or alternatively, the system may consider the discount price of the large capacity virtual machines offered by cloud vendors. For example, because the base load virtual machines may be powered off very rarely, the system may determine to use large capacity virtual machines with a fixed price, instead of those charged based on the amount of time that the virtual machines are powered on. After step 805, the method may proceed to step 807.

In step 807, the provisioning service 521 may provision, based on the recommended new catalog composition (e.g., specifying the number of base load virtual machines and the number of peak load virtual machines), virtual machines to form the new catalog. The provisioning service 521 may provision the new catalog based on the customer's instructions. Additionally or alternatively, the provisioning service 521 may automatically provision the new catalog (e.g., periodically) in order to save energy consumption and to optimize the catalog composition. After step 807, the method may proceed to step 809. In step 809, the provisioning service 521 may update other components of the cloud service 505 (e.g., the controller 509, the brokering service 511, the power manager 525, etc.) about the composition of the new catalog.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    determining a base load of a catalog of virtual machines configured to host service sessions;
    determining a peak load of the catalog;
    provisioning, for the catalog and based on the base load, a plurality of first virtual machines;
    provisioning, for the catalog and based on the peak load, a plurality of second virtual machines, wherein a capacity of each of the plurality of first virtual machines is larger than a capacity of each of the plurality of second virtual machines;
    receiving, by a computing device and from a user device, a connection request to access a service session associated with the catalog;
    comparing a load of a plurality of service sessions hosted by the plurality of first virtual machines with a load threshold associated with the plurality of first virtual machines;
    based on determining that the load of the plurality of service sessions hosted by the plurality of first virtual machines satisfies the load threshold associated with the plurality of first virtual machines, determining a second virtual machine, of the plurality of second virtual machines, to host the service session; and
    sending, to the determined second virtual machine, an instruction to host the service session.

2. The method of claim 1, wherein the load of the plurality of service sessions hosted by the plurality of first virtual machines comprises a quantity of the plurality of service sessions hosted by the plurality of first virtual machines, and wherein the load threshold associated with the plurality of first virtual machines comprises a session count threshold associated with the plurality of first virtual machines.

3. The method of claim 1, further comprising:
    receiving, by the computing device and from a second user device, a connection request to access a second service session associated with the catalog;
    based on determining that a load of a second plurality of service sessions hosted by the plurality of first virtual machines does not satisfy the load threshold associated with the plurality of first virtual machines, determining a first virtual machine, of the plurality of first virtual machines, to host the second service session; and
    sending, to the determined first virtual machine, an instruction to host the second service session.

4. The method of claim 3, wherein the determining the first virtual machine to host the second service session is further based on determining that a quantity of service sessions that are currently running through initialization processes on the plurality of first virtual machines does not satisfy a concurrent logon threshold.

5. The method of claim 3, wherein the determining the first virtual machine to host the second service session comprises:
    selecting, based on balancing loads on the plurality of first virtual machines, the first virtual machine to host the second service session.

6. The method of claim 1, further comprising:
    based on a quantity of the plurality of service sessions hosted by the plurality of first virtual machines, a session count threshold associated with the plurality of first virtual machines, a quantity of a plurality of service sessions hosted by the plurality of second virtual machines, and a session count threshold associated with the plurality of second virtual machines, determining a remaining capacity of the catalog; and
    based on determining that the remaining capacity of the catalog does not satisfy a remaining capacity threshold, powering on an additional second virtual machine.

7. The method of claim 1, further comprising:
    based on receiving, by the computing device and from the user device, a connection termination request, terminating the service session associated with the catalog; and
    based on the terminating, powering off the second virtual machine, of the plurality of second virtual machines, that no longer hosts service sessions.

8. The method of claim 1, wherein:
    each of the plurality of first virtual machines is provisioned with a first capacity that is larger than a second capacity; and
    each of the plurality of second virtual machines is provisioned with the second capacity.

9. The method of claim 8, wherein the first capacity comprises a first virtual machine hardware specification including one or more of a first Central Processing Unit (CPU) capacity, a first Random Access Memory (RAM) size, or a first storage size, and wherein the second capacity comprises a second virtual machine hardware specification including one or more of a second CPU capacity, a second RAM size, or a second storage size.

10. The method of claim 1, wherein the load threshold associated with the plurality of first virtual machines is determined based on the capacity of each of the plurality of first virtual machines.

11. The method of claim 1, further comprising:
    monitoring usage of the catalog; and
    applying a best fit curve to the usage to determine a modeled function, wherein the determining the base load of the catalog and the determining the peak load of the catalog are based on the modeled function.

12. A computing device comprising:
    one or more processors; and
    memory storing instructions that, when executed by the one or more processors, cause the computing device to:
        determine a base load of a catalog of virtual machines configured to host service sessions;

determine a peak load of the catalog;
provision, for the catalog and based on the base load, a plurality of first virtual machines;
provision, for the catalog and based on the peak load, a plurality of second virtual machines, wherein a capacity of each of the plurality of first virtual machines is larger than a capacity of each of the plurality of second virtual machines;
receive, from a user device, a connection request to access a service session associated with the catalog;
compare a load of a plurality of service sessions hosted by the plurality of first virtual machines with a load threshold associated with the plurality of first virtual machines;
based on determining that the load of the plurality of service sessions hosted by the plurality of first virtual machines satisfies the load threshold associated with the plurality of first virtual machines, determine a second virtual machine, of the plurality of second virtual machines, to host the service session; and
send, to the determined second virtual machine, an instruction to host the service session.

13. The computing device of claim 12, wherein the instructions, when executed by the one or more processors, further cause the computing device to:
receive, from a second user device, a connection request to access a second service session associated with the catalog;
based on determining that a load of a second plurality of service sessions hosted by the plurality of first virtual machines does not satisfy the load threshold associated with the plurality of first virtual machines, determine a first virtual machine, of the plurality of first virtual machines, to host the second service session; and
send, to the determined first virtual machine, an instruction to host the second service session.

14. The computing device of claim 13, wherein the determining the first virtual machine to host the second service session is further based on determining that a quantity of service sessions that are currently running through initialization processes on the plurality of first virtual machines does not satisfy a concurrent logon threshold.

15. The computing device of claim 13, wherein the determining the first virtual machine to host the second service session comprises:
selecting, based on balancing loads on the plurality of first virtual machines, the first virtual machine to host the second service session.

16. The computing device of claim 12, wherein the instructions, when executed by the one or more processors, further cause the computing device to:
based on a quantity of the plurality of service sessions hosted by the plurality of first virtual machines, a session count threshold associated with the plurality of first virtual machines, a quantity of a plurality of service sessions hosted by the plurality of second virtual machines, and a session count threshold associated with the plurality of second virtual machines, determine a remaining capacity of the catalog; and
based on determining that the remaining capacity of the catalog does not satisfy a remaining capacity threshold, power on an additional second virtual machine.

17. The computing device of claim 12, wherein the instructions, when executed by the one or more processors, further cause the computing device to:
based on receiving, from the user device, a connection termination request, terminate the service session associated with the catalog; and
based on the terminating, power off the second virtual machine, of the plurality of second virtual machines, that no longer hosts service sessions.

18. One or more non-transitory computer readable media storing computer readable instructions that, when executed, cause a computing device to:
determine a base load of a catalog of virtual machines configured to host service sessions;
determine a peak load of the catalog;
provision, for the catalog and based on the base load, a plurality of first virtual machines;
provision, for the catalog and based on the peak load, a plurality of second virtual machines, wherein a capacity of each of the plurality of first virtual machines is larger than a capacity of each of the plurality of second virtual machines;
receive, from a user device, a connection request to access a service session associated with the catalog;
compare a load of a plurality of service sessions hosted by the plurality of first virtual machines with a load threshold associated with the plurality of first virtual machines;
based on determining that the load of the plurality of service sessions hosted by the plurality of first virtual machines satisfies the load threshold associated with the plurality of first virtual machines, determine a second virtual machine, of the plurality of second virtual machines, to host the service session; and
send, to the determined second virtual machine, an instruction to host the service session.

19. The one or more non-transitory computer readable media of claim 18, wherein the computer readable instructions, when executed, further cause the computing device to:
receive, from a second user device, a connection request to access a second service session associated with the catalog;
based on determining that a load of a second plurality of service sessions hosted by the plurality of first virtual machines does not satisfy the load threshold associated with the plurality of first virtual machines, determine a first virtual machine, of the plurality of first virtual machines, to host the second service session; and
send, to the determined first virtual machine, an instruction to host the second service session.

* * * * *